United States Patent [19]

Ishihara

[11] Patent Number: 4,937,804
[45] Date of Patent: Jun. 26, 1990

[54] APPARATUS FOR RECORDING DATA INTO OPTICAL RECORDING MEDIUM

[75] Inventor: Atsushi Ishihara, Kawasaki, Japan

[73] Assignee: Kabushiki Kaisha Toshiba, Kawasaki, Japan

[21] Appl. No.: 166,018

[22] Filed: Mar. 9, 1988

[30] Foreign Application Priority Data

Mar. 10, 1987 [JP] Japan .................................. 62-54649
Mar. 10, 1987 [JP] Japan .................................. 62-54653
Mar. 10, 1987 [JP] Japan .................................. 62-54654

[51] Int. Cl.$^5$ .............................................. G11B 7/00
[52] U.S. Cl. ...................................................... 369/48
[58] Field of Search ................................... 369/47–49, 369/56, 59

[56] References Cited

U.S. PATENT DOCUMENTS 4,571,716 2/1986 Szerlip .................................. 369/54
4,734,901 3/1988 Murakami ............................. 369/59

FOREIGN PATENT DOCUMENTS 0216704 9/1986 European Pat. Off. .

Primary Examiner—Vincent P. Canney
Attorney, Agent, or Firm—Finnegan, Henderson, Farabow, Garrett, and Dunner

[57] ABSTRACT

An optical disk apparatus is adapted to record into and reproduce information from a plurality of blocks on an optical disk medium. The respective block on the optical disk medium has a preformat section which is continuously recorded with a plurality of ID information and a data recording section for recording information. The data recording section contains an information recording area, a recorded flag recording area and a post field. If the number of ID information detected never exceeds 2, then recording of the information into the corresponding block is inhibited, and the information is then recorded into a data alternative area instead.

9 Claims, 6 Drawing Sheets

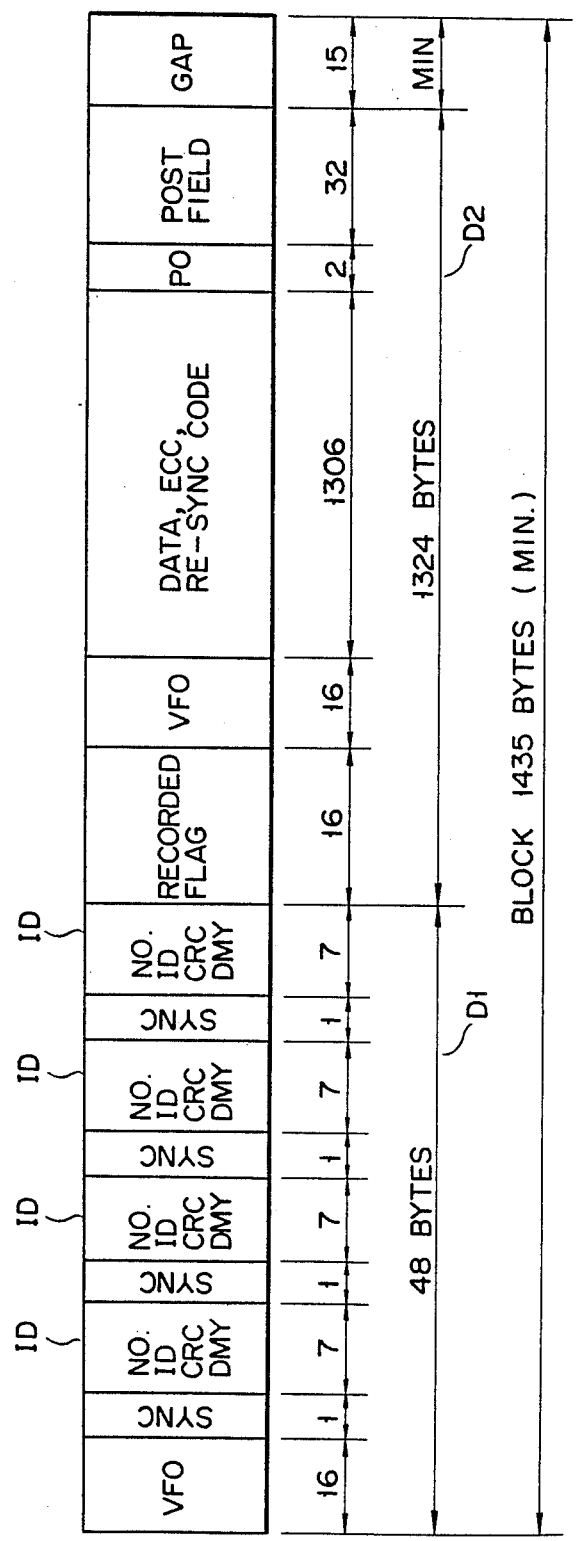
F I G. 2

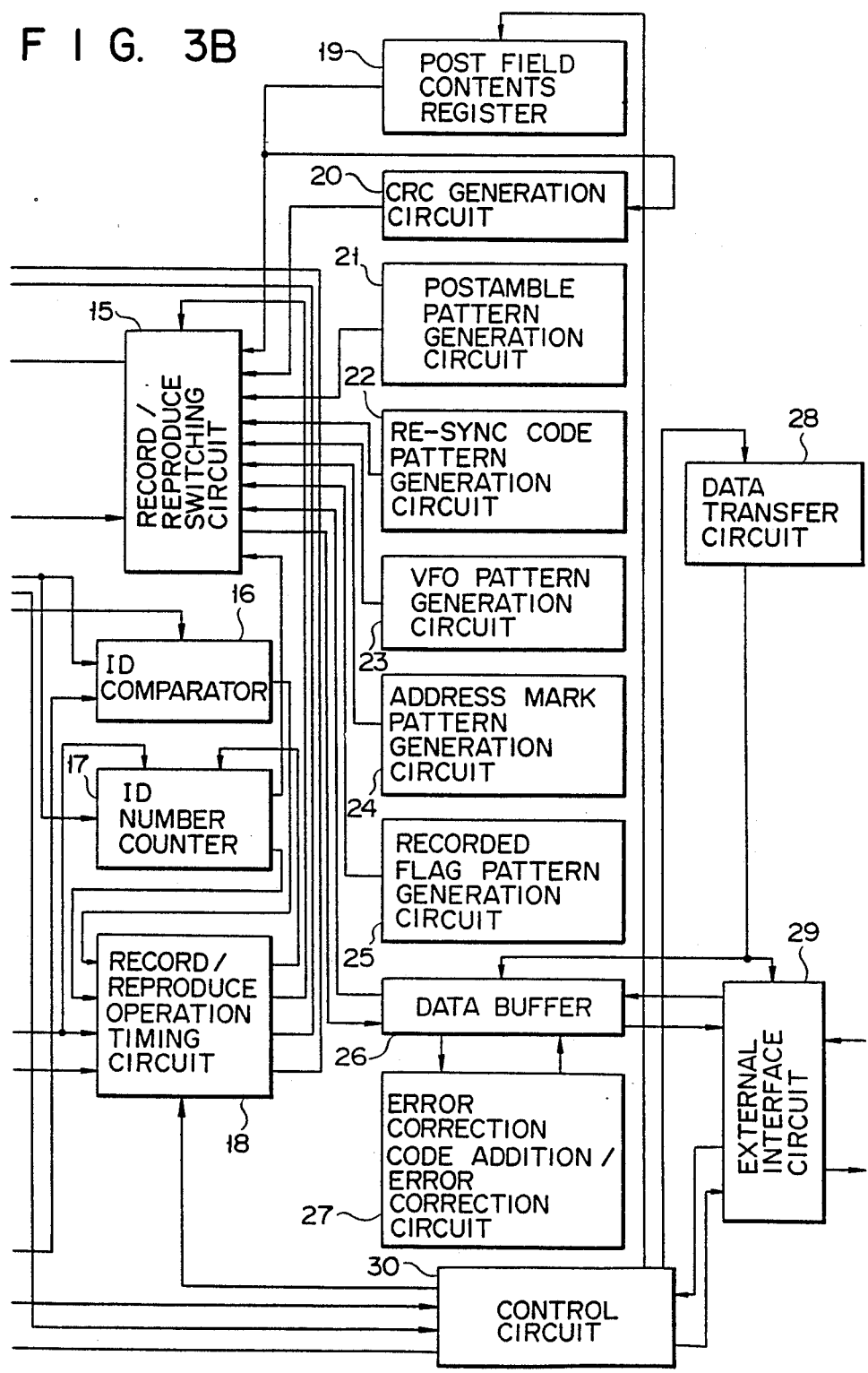
F I G. 3B

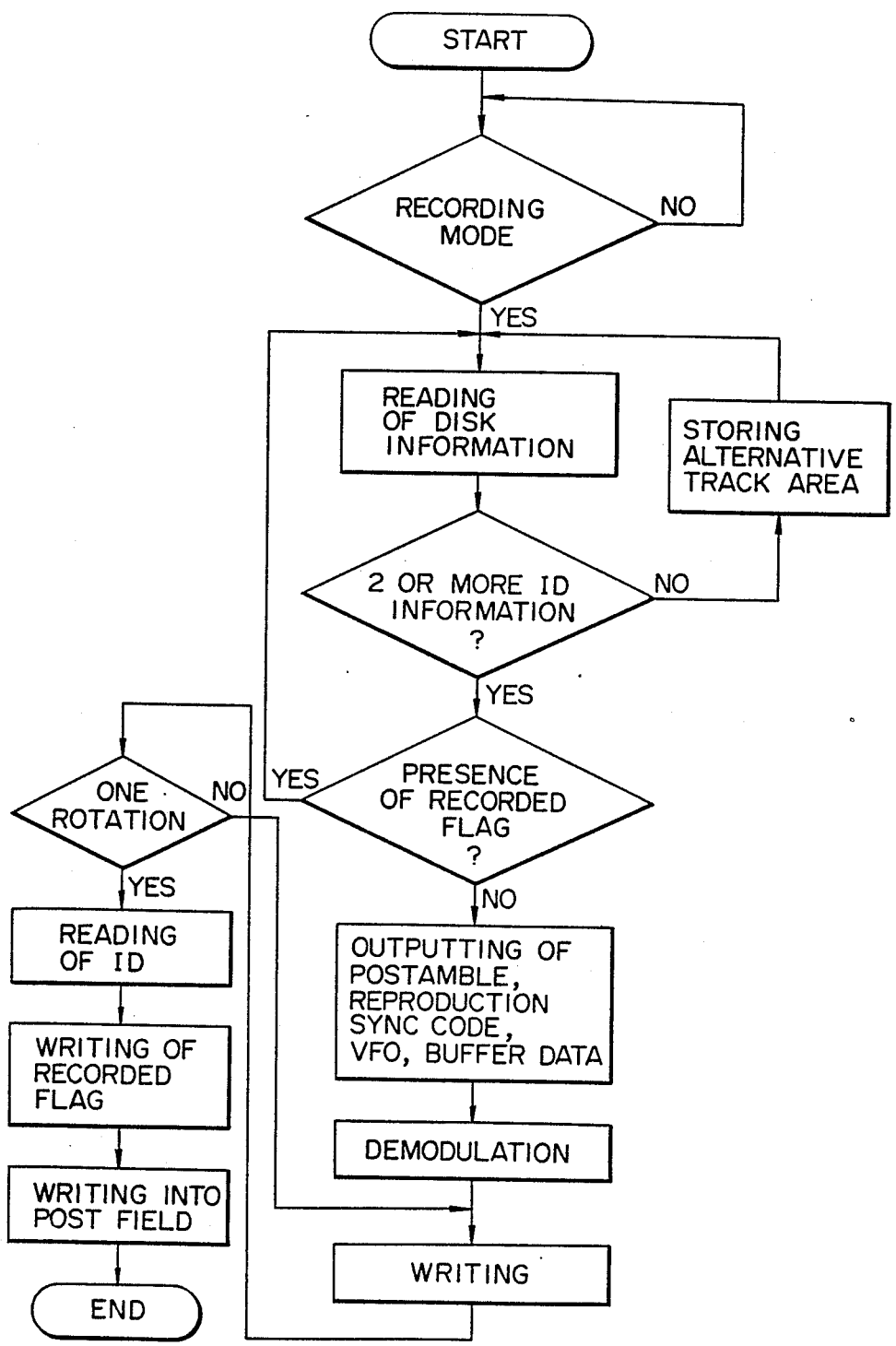
F I G. 4

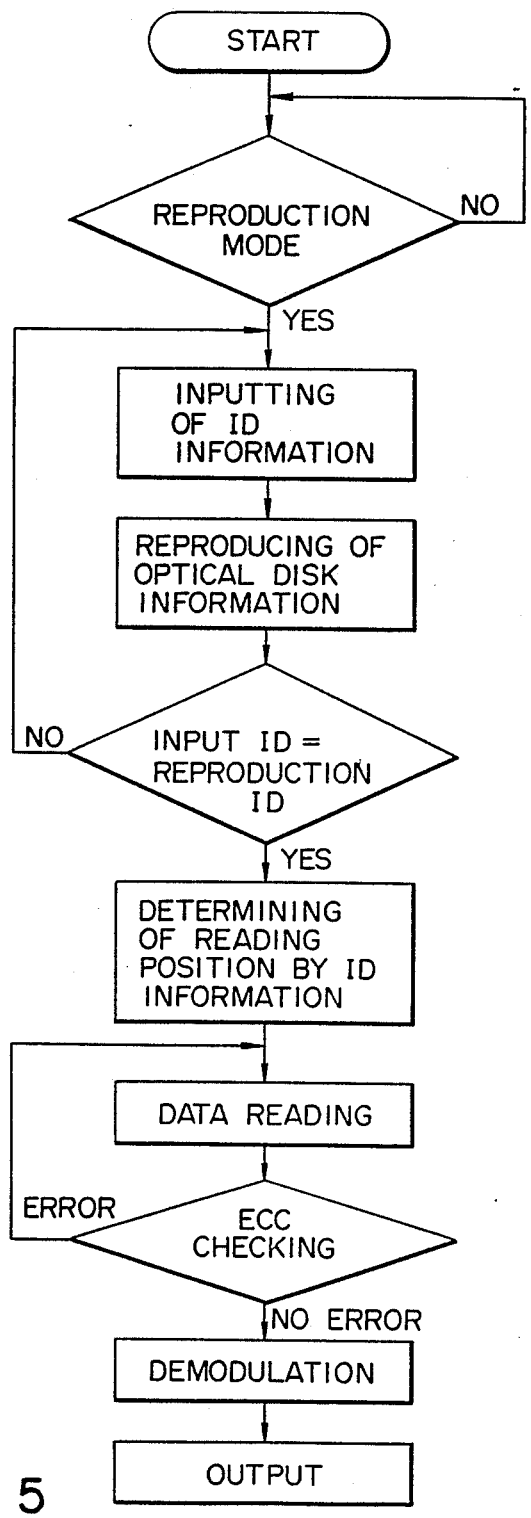
F I G. 5

APPARATUS FOR RECORDING DATA INTO OPTICAL RECORDING MEDIUM

Background of the Invention

1. Field of the Invention

The present invention relates to an apparatus for optically recording data and, in particular, to a CAV type optical disk apparatus.

2. Description of the Related Art

A CAV (constant angular velocity) system and CLV (constant linear velocity) system are known as a system for recording information on an optical disk. The CAV system is adapted to record and reproduce information at a constant bit rate with the number of rotations of an optical disk medium constant. A high-speed seek movement can be achieved without the need of changing the number of rotations of a rotation motor at the time of seek movement for locating a light spot at a predetermined block. Since, in this case, a recording capacity per track of the optical disk medium is fixed irrespective of a radial position, a total memory capacity of the optical disk medium is smaller than in the case of the CLV system.

The CLV system, on the other hand, is adapted to record and reproduce information at a constant bit rate, while changing the number of rotations of a rotation motor in a manner to be inversely proportional to the radial extent of the optical disk medium. For this reason, the memory capacity per track of the optical disk medium increases in proportion with the increasing radial extent of the optical disk medium. Thus the total memory capacity of the optical disk medium is 1.5 times that of the CAV system. As a result, the seek operation time is delayed in view of the need to change the number of rotations of the rotation motor.

An optical recording system is developed as a new recording system for solving the drawbacks of the aforementioned CAV and CLV systems. The new system is of such a type that, with the number of rotations of the optical disk medium fixed, it records and reproduces information while changing a bit rate in a manner to be proportional to the radial extent of the optical disk medium. It is, therefore, possible to achieve a high-speed seek operation without the need of changing the number of rotations of the rotation motor at the time of access on the optical disk medium. Furthermore, the memory capacity per track of the optical disk medium increases in proportion to an increasing radial extent of the optical disk medium in which case the total memory capacity of the optical disk medium is the same as in the case of the CLV system.

When information is to be recorded and reproduced on an optical disk medium of the aforementioned format in accordance with the new system, is can be done relative to a data area following the ID information by accessing or retrieving index information on a target block from an index area and retrieving the ID information on the respective block on the basis of the index information. This method, however, involves a low access speed if it is of such a type that the ID information is accessed after the index information has been read out.

Furthermore, the time at which an optical beam scans one block on the optical disk medium varies and becomes shorter as it is moved toward the outermost track of the disk. Since, in this case, the relative speed of a pick-up head to the optical disk medium becomes faster and faster toward the outermost track, there occurs an event of the ID information going undetected. Furthermore, the optical disk medium may be injured, or deposited with dirt and other fouling matter, at the time of manufacture and usage or at the lapse of time, failing to detect ID information. As a result, there occurs a problem at the time of recording or reproduction. If, at the time of reproduction, ID information goes undetected even after the ID information has been detected at the time of recording and corresponding data has been recorded on the data area following the ID area, recording data cannot be reproduced at the time of reproduction, thus causing a reliability problem.

SUMMARY OF THE INVENTION

It is accordingly the object of the present invention to provide an optical recording apparatus, and an optical recording medium, which can implement a reliable retrieval or access operation and hence assure a high-speed access to the block of the optical recording medium at the time of recording or reproduction.

According to the present invention, use is made of an optical recording medium having a plurality of blocks each having data recording area, recorded flag recording area and data recording area including a post field. Data is stored in the data recording area and, after this is done, a recorded flag is written into the recorded flag area a delete flag is written into the post field.

Since the recorded flag area, data recording area and post field are provided in the respective block, direct information access is gained to the respective block. It is, therefore, possible to readily determine the presence or absence of the data of interest.

BRIEF DESCRIPTION OF THE DRAWINGS

FIG. 2 is a block format of an optical disk medium for use on an optical disk apparatus according to an embodiment cf the present invention;

FIG. 4 is a flowchart for explaining the operation of the apparatus in a recording mode; and FIG. 5 is a flowchart for explaining the operation of the apparatus in a reproduction mode.

DETAILED DESCRIPTION OF THE PREFERRED EMBODIMENT

Figure 1:
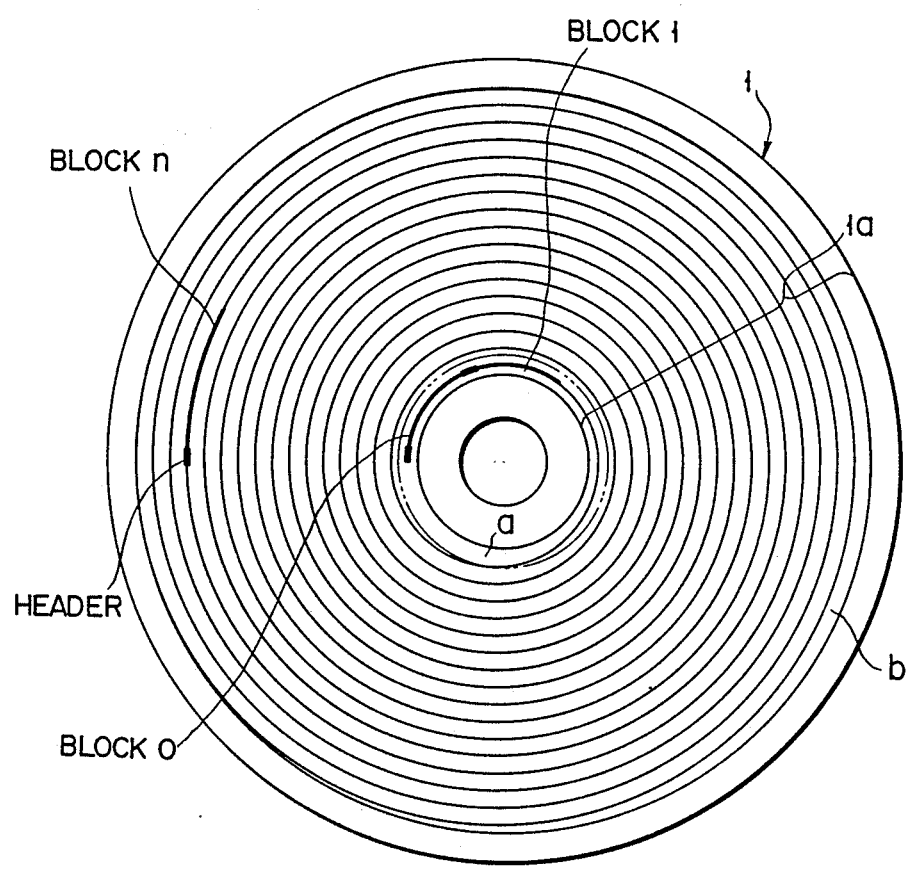
FIG. 1 is a plan view showing an optical disk medium.

FIG. 1 shows optical disc medium 1 for use in optical disk apparatus. The optical disk medium is of such a type that it has a reference position mark as "0" and that approximately a hundred thousand blocks are formed on 36000 tracks thereon. The number of blocks per track varies in a numeral range of 14 to 28 from the innermost track to the outermost track on the optical disk medium. The bit rate is so designed that it is switched at 114 stages for each 165 tracks within a radial range of 30 to 60 mm with the change of the bit rate between the adjacent track stages restricted within a range of 1%.

A block header is provided at a start position of the respective block at the time of manufacturing, for example, optical disk mediums.

The respective block is so formated as shown in FIG. 2, that is, it has a preformat section D1 and data section D2 in the header A. The preformat section D1 has a preamble VF0 and four subsequent ID areas ID. The respective ID area ID stores a block number of ID's CRC and DYM and the data D2 has a "registered" flag; VFO; data, ECC re-sync code; PO; POST FIELD; and block gap (GAP).

Optical disk medium 1 is of such a type that defect management information is recorded on the innermost track of record section 1a as shown in FIG. 1 in which case record section 1a is employed as an "alternate" area for that defect management information. In this case, it is to be noted that there is an "alternate" area corresponding to, for example, 1000 tracks on the disk. Furthermore, a user's area (user's recording area) b is provided as such so that the user can use that user's area.

As shown in FIG. 3, data is written and read by optical head 2 into and out of optical disk medium 1. Optical head 2 includes a semiconductor laser, optical system, tracking system, focusing system and photoelectric sensor. The output of optical head 2 is connected via reproduction signal amplifier 3 to reproduction signal binary coding circuit 4 where a reproduction signal is converted to a digital signal, that is, 2-7 modulation signal.

Laser drive circuit 5 is connected to a drive signal input terminal of optical head 2 to receive a modulation signal from modulation circuit 6 so that semiconductor laser of optical head 2 may be driven. The output of reproduction signal binary coding circuit 4 is connected to reproduction sync clock extraction circuit 7, demodulation circuit 8 and address mark detection circuit 9. Reproduction sync clock extraction circuit 7 is of such a type as to allow a demodulation clock to be generated from the 2-7 code modulation signal. Demodulation circuit 8 allows the 2-7 code demodulation signal to be demodulated into an NRZ signal in response to the demodulation clock. Address mark detection circuit 9 is provided before the ID information and adapted to detect an address mark containing an irregular pattern departing from a 2-7 code conversion convention.

The output of demodulation circuit 8 is connected to record flag detection circuit 10, ID shift register 11, CRC detection circuit 12 and record/reproduce switching circuit 15. The output of CRC detection circuit 12, along with the output of address mark detection circuit 9, is connected to ID detection timing circuit 13. The output of ID detection timing circuit 13 is connected to ID shift register 11, CRC detection circuit 12 and a timing signal input terminal of comparator 16.

The output of ID shift register 11 is connected to ID comparator 16 and ID number counter 17. The output of ID comparator 16, along with the output of ID number counter 17, is connected to record/reproduce timing circuit 18. The output of record/reproduce timing circuit 18 is connected to laser drive circuit 5, demodulation circuit 6, record/reproduce switching circuit 15 and ID number counter 17. Recorded flag detection circuit 10, along with the output of ID shift register 11, is connected to control circuit 30 which includes, for example, a CPU. The output of control circuit 30 is connected to record/reproduce IC register 14 and another input terminal of record/reproduce timing circuit 18. To record/reproduce switching circuit 15 are connected post-field contents register 19, CRC generating circuit 20, postamble pattern generation circuit 21, resync code pattern generation circuit 22, VFO pattern generation circuit 23, address mark pattern generation circuit 24, recorded flag pattern generation circuit 25, data buffer 26, error correcting code addition/error correcting circuit 27 and record/reproduce switching circuit 15. Data buffer 26, data transfer circuit 28 and control circuit 30 are connected to an external apparatus via an external device.

When optical disk medium 1 is rotated by a rotation motor, not shown, at 925 rpm for example on the optical disk apparatus and optical head 2 is driven by laser drive circuit 5, the guide groove of the optical disk medium is traced by a laser spot coming from optical head 2. Recording and reproduction are performed in block units and, in this case, a seek operation is performed so that the light spot is located on a predetermined block. In the seek operation, a reproduction signal which is obtained from optical head 2 is amplified by reproduction signal amplifier 3 and then converted by reproduction signal binary coding circuit 4 to 2-7 code-modulation digital signal. The digital signal is supplied to reproduction sync clock extraction circuit 7 where a sync clock is extracted from the reproduction signal. Demodulation circuit 8 demodulates the aforementioned digital signal to an NRE signal in synchronization with the sync clock. When address mark detection circuit 9 receives the digital reproduction signal from the reproduction signal binary coding circuit and detects an address mark immediately preceding ID information, ID detection operation timing circuit 13 is driven while receiving a signal from CRC detection circuit 12. CRC detection circuit 12 makes a CRC check with the use of CRC which is set for the respective ID number. If the result of CRC checking is found incorrect, that ID information is discarded and, if correct, ID detection operation timing circuit 13 generates an output signal. ID detection operation timing circuit 13 supplies an ID detection operation timing signal to ID shift register 11. ID shift register 11 transfers, in response to the ID detection operation timing signal, ID information number data to ID number counter 17 and also send its memory contents to control circuit 30.

Control circuit 30 recognizes the present position of a light spot from the ID information and drives a drive means, not shown, which in turn drives the optical head and object lens within the optical head so that the light spot is moved to a target block in a target track. Control circuit 30 sets the ID information of the target block to record/reproduce ID register 14 to allow it to confirm whether or not the ID information entered coincides with the ID information of the target block. The ID information thus set is entered into comparator 16 for comparison to be made with the input ID information of ID shift register 11.

When a correct signal is output from CRC detection circuit 12 and comparator 16 produces a signal representing a coincidence of the ID information of the target block with the read ID information, then a timing signal necessary for record/reproduce operation is supplied from record/reproduce operation timing circuit 18 to laser drive circuit 5, demodulation circuit 6, record/reproduce switching circuit 15 and ID number counter 16. The operation of record/reproduce operation timing circuit 18 is initially set according to the present invention. If, therefore, an operation signal is input from CRC detection circuit 12 and ID comparator 16, record/reproduce operation timing circuit 18 is not operated in the case where control circuit 30 is set to an operation inhibiting state.

When, at the time of seeking, a light spot is to be moved to a target block or data is written into, or read out of, the target block, it is necessary to correctly detect the ID information. In this case, however, there is a possibility that an error will occur, upon the detection of ID information, due to an injured mark produced during the manufacture of an optical disk medium, to the fouling of the optical disk medium, and to the degradation of a recording area resulting from aging. In general, the error rate on the optical disk is about $1 \times 10^{-5} \sim 1 \times 10^{-4}$ errors/bit and, therefore, the probability of error occurrence in 8-byte (=64 bits) ID information is about $64 \times 1 \times 10^{-5} \sim 64 \times 1 \times 10^{-4}$, a figure which is much higher than an error occurrence rate of $10^{-12}$ errors/byte involved after data-correction has been made according to the error correction procedure. In accordance with the present invention, ID information is multiplexed as a quadruple format and recorded into optical disk medium 1. By so doing it is possible to considerably decrease the error occurrence rate at the time of detecting the ID information. The Table below shows an error occurrence rate when the number of ID information per block is 4, 3 or 2.

| Number ID Information | ITEM | PI = 2 × 10⁻³ | | PI = 5 × 10⁻³ | |
|---|---|---|---|---|---|
| | | occurrence | occurrent block/ recording plane | occurrence | occurrent block/ recording plane |
| 4 | 3/block not readable | $3.19 \times 10^{-3}$ | 0.01 | $4.98 \times 10^{-7}$ | 0.19 |
| | 4/block not readable | $1.6 \times 10^{-11}$ | $6.25 \times 10^{-6}$ | $6.25 \times 10^{-10}$ | $2.44 \times 10^{-4}$ |
| 3 | 2/block not readable | $1.2 \times 10^{-5}$ | 4.69 | $7.46 \times 10^{-5}$ | 24.14 |
| | 3/block not readable | $8 \times 10^{-9}$ | 0.003 | $1.25 \times 10^{-7}$ | 0.05 |
| 2 | 1/block not readable | $3.99 \times 10^{-3}$ | 1558.6 | $9.95 \times 10^{-3}$ | 3886.7 |
| | 2/block not readable | $4 \times 10^{-6}$ | 1.56 | $2.5 \times 10^{-5}$ | 9.77 |

If, as shown in the Table above, 4 ID information is provided for each block on the assumption that the probability of an error occurring at one ID area is $5 \times 10^{-3}$, then the probability of any one of 4 ID information going undetected will be $(5 \times 10^{-3})^4 = 6.25 \times 19^{-1}$, a figure equal to, or lower than, the probability of $10^{-9} \sim 10^{-10}$ given as a data error occurrence within one block. This is a practically adequate read-out rate as achieved by the multiplexing of the ID information as a quadruple format. The probability of 3 ID information being defective, if expressed as the number of blocks per recording plane, will be 0.19 blocks, a value which is practically allowable. In the case where 3 ID information are provided for each block, the probability of 2 ID information going undetected will be 29.14 blocks per recording plane and the probability any one of three ID information going undetected will be 0.05 block per recording plane. This numeral range poses no practical problem. If, however, only two ID information is provided for one block, the error occurrence rate will be 3886.7/recording plane, a value which is considerably greater. It is, therefore, necessary to provide three or more ID information within one block. Since increasing the ID information results in a corresponding decrease in a total data memory capacity, it is preferable to provide 3 to 5 ID information.

As will be appreciated from the above, it is necessary that, in order to assure a positive ID information detection at the time of reproduction, the condition of detecting the ID information at the time of recording be made stricter than at the time of reproduction. It is, therefore, necessary to detect at least two ID information at the time of recording. Unless the two ID information are detected at that time, the recording of the data on the corresponding block is inhibited and the data is transferred to the alternative area a for recording. In this case, the aforementioned inhibition and the recording of the data in the alternative area are controlled by control circuit 30.

The operation of the recording mode will be explained below by referring to a flowchart of FIG. 4

Upon setting the optical disk apparatus to a recording mode, correctly detected one or ones of the ID information are sequentially entered to control circuit 30 via ID shift register 11. Upon receipt of two or more ID information, control circuit 30 delivers a signal indicative of the start of the recording operation to record/reproduce operation timing circuit 18. Record/reproduce operation timing circuit 18 supplies a "record" control signal to record/reproduce switching circuit 15. Upon receipt of the control signal, record/reproduce switching circuit 15 selectively supplies the data of postamble pattern generation circuit 21, reproduction sync code pattern generation circuit 22, VFO pattern generation circuit 23 and data buffer 26 to modulation circuit 6.

Data buffer 26 stores recording data coming from data transfer circuit 28 and is supplied to error correcting code addition/error correcting circuit 27 where an error correction code is added to recording data. For a read-after-write mode at the time of recording, correction is made, based on a minor correction capability, by means of error correcting code addition/error correction circuit 27 to perform a strict checking, while, at the time of reproduction, correction is made based on an ordinary error correction capability.

The data reproduced from the optical disk by the optical head has an error rate of $10^{-4}$. The minor correction capability means a capability for correcting the reproduced data at an error rate of $10^{-9}$, while the ordinary error correction capability means a capability for correcting the reproduced data by an error rate less than $10^{-12}$.

Record/reproduction switching circuit 15 receives an ID number value from ID number counter 17 in which case the ID value of the last ID information, which is detected by ID number counter 17, is loaded into record/reproduce switching circuit 15. In this connection it is to be noted that the ID number value corresponds to a distance, for example, a byte number, from the detected last ID information recording position to the data recording start position. From this it is possible to determine the data recording start position.

When the ID number value is reached by the countdown operation of ID number counter 17, a recording timing signal is supplied to switching circuit 15. At this time, the data of postamble pattern generation circuit 21, reproduction sync code pattern generation circuit 22, VFO pattern generation circuit 23 and data buffer 26 are input to modulation circuit 6. Upon receipt of a modulation signal from modulation circuit 6, laser drive circuit 5 drives a semiconductor laser in optical head 2.

Using the laser beam generated from the semiconductor laser, data is written, from a data record start position of a predetermined block on optical disk medium 1.

After data has been written into that data section, the data of ID number counter 17, post field contents register 19, CRC generation circuit 20 and address mark pattern generation circuit 24 are written into a post field following the data area. The data of control circuit 30 is input to post field contents register 19. Upon data elimination, a delete flag is written into the post field.

After predetermined data has been recorded in a corresponding designated block and then a light spot has reached said block after one rotation of optical disk medium 1, a flag is written as a recorded flag from recorded flag pattern generation circuit 25 into a corresponding recorded flag area so as to prevent data from being overlappingly written into the same block. That is, when the recorded block is again designated in a record mode, the record flag is read out and written into recorded flag register 10. Control circuit 10 checks the presence of that flag in recorded flag register 10 and, if detecting the recorded flag, inhibits the recording of that flag.

If only one ID data is detected, writing the data into the corresponding block is inhibited and that data is transferred to the alternative area on the optical disk and recorded therein. In this procedure, control circuit 30 designates a "alternative" track number (No.) and "alternative" block number (No.) of one block in the "alternative" area a and moves the light spot to the "alternative" block. If control circuit 10 detects the ID data in the "alternative" block, predetermined data is written into the "alternative" block through an operation similar to the aforementioned recording operation.

The flowchart of FIG. 5 will now be explained below in conjunction with a reproduction mode in which data is read out of optical disk medium 1. With the reproduce mode set on the apparatus, ID data of the block which is to be reproduced is input to the apparatus. The input ID data is recorded to record/reproduce ID register 14. The ID data which is to be reproduced from optical disk 1 is stored in ID shift register 11. Shift register 11 performs a shifting operation, each time correct ID data is entered, and sequentially transfers the ID data to control circuit 30. Control circuit 30 executes the reproduce mode if it detects one ID data. That is, a reading position is determined by the ID data number value detected, so that the data starts to be read out. In this case, only data error correcting code of the data area is transferred to data buffer 26 and then to error correcting code error correcting circuit 27 for ECC checking.

A reproduction signal is supplied to demodulation circuit 8 through reproduction signal amplifier 3 and reproduction signal binary coding circuit 4. ID comparator 16 compares the reproduction ID data with a target ID data which is set and, if a coincidence is detected therebetween, sends a coincidence signal to record/reproduce operation timing circuit 18. Upon receipt of the coincidence signal, record/reproduce operation timing circuit 18 sends a control signal to record/reproduce switching circuit 15. Switching circuit 15 allows a demodulation signal of demodulation circuit 8 to be conducted to data buffer 26. The reproduction data of data buffer 2 is input via external interface 29 to an output device, such as a display unit or a printer.

The optical disk apparatus of the present invention allows a direct access to respective blocks and can improve an access speed.

What is claimed is:

1. An apparatus for recording data on an optical recording medium on which a plurality of blocks are provided corresponding to a plurality of positions, each of said blocks having a header and a data recording area, said header including a plurality of block numbers each indicating the corresponding one of said portions, and said data recording area recording data, comprising:
   means for reproducing the block numbers from the header of said optical recording medium;
   means, responsive to at least two of said block numbers which are reproduced by said reproducing means, for outputting a detection signal; and
   means for recording, in response to the detection signal, the data into the data recording area corresponding to the block numbers reproduced.

2. The apparatus of claim 1, in which said recording means comprises medium drive means for rotating said optical recording medium at a constant speed and means for recording the data into said data recording area at a bit rate varying in a radial direction of said optical recording medium.

3. An apparatus for recording data on an optical recording medium on which a plurality of blocks are provided corresponding to a plurality of positions, each of said blocks having a header and a data recording area, said header including a plurality of block numbers each indicating the corresponding one of said positions, and said data recording area recording data, comprising:
   means for reproducing the block numbers from the header of said optical recording medium;
   means for recording the data into said optical recording medium; and
   means for inhibiting recording of the data on the data recording area when at least two of said block numbers are not reproduced by said reproducing means.

4. The apparatus of claim 3, in which said optical recording medium includes an alternative recording area having a predetermined number of blocks, and said recording means has means for recording the data, which was inhibited from being recorded by said inhibiting means, into the alternative recording area.

5. The apparatus of claim 3, in which said recording means comprises medium drive means for rotating said optical recording medium at a constant speed and means for recording the data into said data recording area at a bit rate varying in a radial direction of said optical recording medium.

6. The apparatus of claim 1, wherein said reproducing means includes means for generating a start signal indicating the start of a recording operation, when said at least two block numbers are reproduced, and said recording means includes means for modulating the data to be recorded on said recording medium to output a modulated signal, means for providing the data to be recorded to said modulating means, and laser means for generating a laser beam on the recording medium in accordance with the modulated signal, to write the data in the recording area.

7. The apparatus according to claim 6, wherein said recording means includes means for supplying a flap indicating a completion of data-recording to said laser means, to record the flag on the recording area, after the data has been recorded on the recording area.

8. The apparatus of claim 7, wherein said recording means includes means for detecting the flag from the data reproduced by said reproducing means, to output a flag signal, and means for inhibiting the recording of data onto the recording area corresponding to the flag, in response to the flag signal.

9. The apparatus of claim 1, wherein said recording medium has an alternative recording area, said detection signal outputting means generates a further detection signal when only one of the block numbers is reproduced, and said recording means includes means for recording the data on the alternative recording area, in response to the further detection signal.

* * * * *

UNITED STATES PATENT AND TRADEMARK OFFICE
CERTIFICATE OF CORRECTION

Figure 3A:
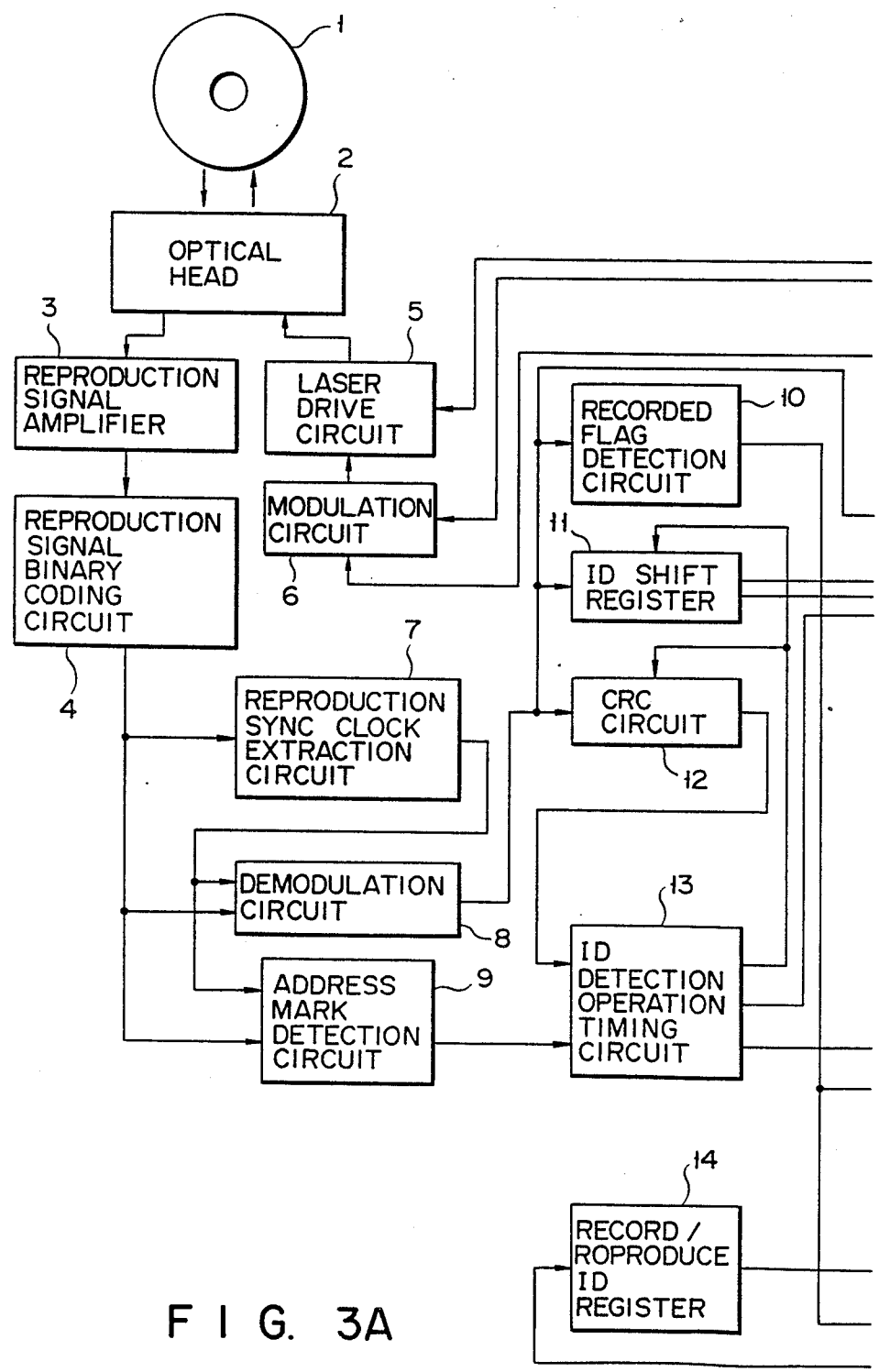
FIGS. 3A and B are a block circuit diagram showing an optical disk apparatus of the present invention.

PATENT NO.  : 4,937,804
DATED       : June 26, 1990
INVENTOR(S) : Atsushi Ishihara It is certified that error appears in the above-identified patent and that said Letters Patent is hereby corrected as shown below:

Figure 3A, number 14, change "ROPRODUCE" to --REPRODUCE--.

Signed and Sealed this

Twenty-sixth Day of October, 1993

Attest:

BRUCE LEHMAN

Attesting Officer

Commissioner of Patents and Trademarks